(12) United States Patent
Gutierrez et al.

(10) Patent No.: US 6,516,109 B2
(45) Date of Patent: Feb. 4, 2003

(54) LOW INSERTION LOSS NON-BLOCKING OPTICAL SWITCH

(75) Inventors: Roman C. Gutierrez, La Crescenta, CA (US); Tony K. Tang, Glendale, CA (US)

(73) Assignee: SiWave, Inc., Arcadia, CA (US)

( * ) Notice: Subject to any disclaimer, the term of this patent is extended or adjusted under 35 U.S.C. 154(b) by 22 days.

(21) Appl. No.: 09/853,514

(22) Filed: May 11, 2001

(65) Prior Publication Data

US 2001/0051015 A1 Dec. 13, 2001

Related U.S. Application Data

(60) Provisional application No. 60/207,435, filed on May 30, 2000.

(51) Int. Cl.[7] .................................................. G02B 6/26
(52) U.S. Cl. .............................. 385/17; 385/16; 385/18
(58) Field of Search ........................ 385/16–25, 33–37

(56) References Cited

U.S. PATENT DOCUMENTS 5,206,497 A    4/1993   Lee .......................... 250/201.1
5,692,077 A   11/1997   Stone et al. .................. 385/16
6,005,998 A   12/1999   Lee ............................. 385/33
6,072,923 A    6/2000   Stone .......................... 385/16
6,097,859 A    8/2000   Solgaard et al. .............. 385/17

FOREIGN PATENT DOCUMENTS

WO    WO 00/52835 A3    9/2000    ............ G02B/6/26

*Primary Examiner*—Phan T. H. Palmer
(74) *Attorney, Agent, or Firm*—MacPherson Kwok Chen & Heid LLP (57) ABSTRACT

An optical switch is provided, in which input light from a fiber is directed across a free-space region to a corresponding one of a first set of beam steering elements, such as moveable mirrors, which then re-directs the light beam back through the free-space region to a desired one of a second set of beam steering elements. This beam steering element sends the light back again through the free-space region to a corresponding output fiber. The interfaces to both the input and output fibers include a collimating element, such as a lens. In other embodiments, an optical switch has fibers and moveable mirrors only on one substrate of the switch. The other substrate has at least a stationary mirror. The moveable mirrors and the stationary mirror direct light to the fibers such that the fibers can be used as either inputs or outputs of the switch, thereby allowing switch re-configurability.

51 Claims, 4 Drawing Sheets

LOW INSERTION LOSS NON-BLOCKING OPTICAL SWITCH

CROSS-REFERENCE TO RELATED APPLICATIONS

This application claims priority to U.S. Provisional Appl. Serial No. 60/207,435, filed May 30, 2000.

BACKGROUND

1. Field of Invention

The present invention relates to free-space optical switches, and particularly to a scalable, non-blocking, low insertion loss, re-configurable optical switches.

2. Related Art

An optical switch is a device for controlling the routing of light from one input port to any one of a number of output ports. A free-space optical switch is one in which the optical path is predominantly in an unguided medium. A non-blocking switch is one in which any input port can be connected with any unused output port, e.g., there are no particular paths between any input port and unused output port that are blocked because of other connections supported within the switch.

There are many ways to control the propagation of light. One way is to change the propagation direction of the light within the switch to direct the light through free-space to a desired output port, such as by rotating refractive (e.g., prisms) or reflective (e.g., mirrors) elements. Typically, the switch size is described in terms of the number of input and output ports. For example, a 2×2 switch would allow each of two input ports to be connected any of two output ports. Typical switch sizes range from 2×2 to 32×32. Future projections, however, show a commercial demand for non-blocking switches as large as 2048×2048 or more.

One important performance metric of optical switches is their insertion loss, defined (in dB) as $10 \log (I_i/I_o)$, where $I_i$ is the optical power applied to the input of the switch and $I_o$, is the optical power transmitted through the switch (arriving at the desired output port). Achieving a low insertion loss is an important goal for any optical switch design. This requires, for example, careful control of the input position and propagation direction of the light as it is inserted into the free-space medium, accurate control of the propagation direction of the light within the switch, and efficient collection of the light into the output port. In general, the free-space beam must arrive at the desired output port at the proper position and propagation angle to be coupled efficiently into this port. The effect of even small translations or angular deviations from the nominal values can lead to a reduction in coupling, and hence an increase in insertion loss.

Typical insertion losses range from 7 dB for small switches (e.g., 16×16) to 20 dB for larger switches. Larger switches exhibit higher insertion loss due to both diffraction effects and pointing-error-induced translation errors of the propagating beam increase as the optical pathlength is increased. The ability of a particular switch's design technology to enable the fabrication of larger format switches with appropriately small insertion loss is defined generally as the scalability of the switch.

A related performance metric is the uniformity of the insertion loss over all of the possible connections within the switch. In a large switch, the insertion loss may vary between 3 dB and 7 dB over the entire range of switch connections. It is desirable to have a lower and more uniform insertion loss between any input to output optical path.

Currently, large format optical switches are developed using microfabrication techniques to create large arrays of small, movable, opto-mechanical two and three-dimensional structures. In a typical two-dimensional approach, a two-dimensional array of mirrors is used to deflect the light from any input fiber to any output fiber. For an N×M switch, the mirror array contains a total of N times M mirrors. Every mirror is used only for one particular switch connection, and it is moved out of the way for any other switch state. As such, the typical two-dimensional approach can be non-blocking, although many are not, such as disclosed in U.S. Pat. No. 6,072,923, entitled "Optical Switching, Routing, and Time Delay Systems Using Switched Mirrors", incorporated by reference in its entirety.

Even if this approach is non-blocking, there is the problem of limited scalability, due mostly to the requirement of using the same number of mirrors as switch states. For an N×M switch, N×M mirrors need to be arranged in a two-dimensional plane to provide the desired optical paths. Larger size mirrors increase the optical path length and the size of the switch, while smaller mirrors increase the insertion loss. Thus, a typical two-dimensional switch will have unacceptably larger insertion losses and larger state-dependent losses (larger non-uniformity), as the number of input and output ports is increased. U.S. Pat. No. 6,097,859, entitled "Multi-Wavelength Cross-Connect Optical Switch", which is incorporated by reference in its entirety, discloses a two-dimensional switch that has limited scalability. Further, because the two dimensional switch has N×M mirrors, issues with manufacturing yield and operating reliability also become important as the number of ports in the switch is increased.

Three-dimensional approaches allow smaller optical path-lengths and greater uniformity in optical pathlengths, due in part to the ability to distribute the number of N×M optical paths within a three-dimensional volume, instead of a two-dimensional plane. The effect of this is a reduction in insertion loss and insertion loss non-uniformity over that provided by a similar size, two-dimensional switch. However, current three-dimensional approaches also have problems, such as with size, scalability, and complexity.

In one approach, described in PCT Int'l Publ. No. WO 00/52835, entitled "Opto-Mechanical Valve and Valve Array for Fiber-Optic Communication", incorporated by reference in its entirety, the three-dimensional switch still requires a large number of movable mirrors, with little description on reducing insertion loss. Other types of three-dimensional switches that reduce the number of mirrors necessarily increases the complexity, such as by requiring each mirror to have a large number of discrete pointing positions, e.g., corresponding to each input or output port. This requires precise alignment of the fibers and lenses with respect to each other and with respect to the micromirrors. Furthermore, positioning and control of the micromirrors can become complicated, thereby increasing the cost and complexity of designing and making such switches.

Other current types of optical switches utilize feedback to accurately adjust the propagation direction of the free-space beam, such as disclosed in U.S. Pat. No. 5,206,497, entitled "Free-Space Optical Switching Apparatus", and complex beam pointing circuitry, such as disclosed in U.S. Pat. No. 6,005,998, entitled "Strictly Non-Blocking Scalable Matrix Optical Switch", both of which are incorporated by reference in their entirety. Both these types of switches introduce added complexity and expense to the switch.

Current optical switches typically also have fixed fiber inputs and outputs, i.e., one set of fibers are used as light inputs and another set of fibers are used as light outputs. This fixed configuration of inputs and outputs limits the flexibility of the switch.

Accordingly, it is desirable to make and have a large free-space optical switch without the disadvantages discussed above with current optical switches.

SUMMARY

In accordance with one aspect of the invention, a free-space non-blocking optical switch includes two planar substrates facing each other, with each substrate having patterns of beam steering elements (e.g., moveable mirrors, either singularly or in an array) and fiber interfaces with collimating elements (e.g., lenses). Each of a plurality of input and output fibers has an associated lens and beam steering element. The fibers are held in lithographically-defined through-holes in the substrate, and the associated lenses are located by lithographically-defined kinematic points in the substrate. The kinematic points set the lateral position of the lens with respect to the fibers. The use of lithography to determine the relative placement of the critical optical elements increases the precision and reduces the manufacturing costs. Other embodiments utilize fibers and lenses that are pre-aligned so that these assemblies can be mounted on a machined part rather than on a micromachined part with lithographic precision. This is due to relaxed lateral tolerances (e.g., from ~1 micron to ~50 microns). In addition, it is possible that the lenses (with or without fiber) may be actively aligned, in which case the lithographic precision is not needed.

The light from an input fiber exits the fiber with a relatively large divergence angle. It is focused by the lens into a collimated beam and directed, in one particular embodiment, after reflection from a fixed mirror, to the beam steering element associated with this fiber. The beam steering element is then controlled so as to direct the light to the beam steering element associated with the desired output fiber. The beam steering element associated with the desired output fiber is then controlled so as to direct the light to the output fiber lens and thus into the output fiber. The establishment of a path through the switch requires the control of two beam steering elements. The use of multiple mirrors, each with multiple positions, reduces the total number of mirrors required. Thus, an N×M switch can be formed with N+M, instead of N×M, mirrors.

According to an embodiment, a three-dimensional optical switch is constructed from beam steering elements placed in a substantially circular pattern about a central point, with the corresponding fiber and lens pairs also located in a substantially circular pattern of larger diameter about the same central point. The input terminated fiber waveguides, lenses, and beam steering elements may be located on a separate plane from the output terminated fiber waveguides, lenses, and beam steering elements.

Alternatively, according to another aspect of the invention, the waveguides, lenses, and beam steering elements are located on, but not necessarily limited to, the same plane through the use of an opposing stationary mirror or mirrors which "fold" the light back through the waveguides. Each beam steering element is moveable to direct light to at least some other beam steering elements or lenses. The "folding" mirror allows the switch to be re-configurable in that a switch with N+M fibers and N+M beam steering elements can be re-configured, either through software or hardware, to form 1 by (N+M−1), 2 by (N+M-2), . . . , N by M, . . . , (N+M-2) by 2, and (N+M−1) by 1 size switches.

Thus, the fibers are indistinguishable as inputs and outputs and can be used as both. This advantageously increases the flexibility of the switch by allowing a switch to be configured as many different size switches. Larger switches can be made using mirrors that are multi-stage, which require a lower number of controllable positions per mirror than single stage mirrors. For an 3-stage mirror with the first stage having k controllable positions, the second stage having m controllable positions, and the third stage having n controllable positions, a k*m*n port switch can be formed from mirrors having only k+m+n controllable positions.

The use of circular symmetry within a three-dimensional optical switch reduces the variation in path length relative to that which is inherent in similar size conventional two-dimensional switches. The use of circular symmetry and an appropriate choice of the radius of the circles on which both the fiber and lens pairs and the beam steering elements lie allows for the use of beam steering elements which have a substantially constant elevation angle.

According to one embodiment, the beam steering elements are moveable mirrors whose aiming direction is determined through contact with lithographically-defined kinematic points. The use of lithographically-defined kinematic points allows precision aiming of the mirrors without the use of feedback control and circuitry.

The present invention will be more fully understood when taken in light of the following detailed description taken together with the accompanying drawings.

BRIEF DESCRIPTION OF THE DRAWINGS

Use of the same or similar reference numbers in different figures indicates same or like elements.

DETAILED DESCRIPTION OF THE PREFERRED EMBODIMENTS

In accordance with one aspect of the present invention, an optical switch is formed from two assemblies, with a first assembly accepting input fibers and having first moveable mirrors, and the second assembly accepting output fibers and having second moveable mirrors. Light from the input fibers is directed and travels through free-space to the second assembly, where one of the second moveable mirrors reflects the light to an appropriate one of the first moveable mirrors. That first moveable mirror then reflects the light to the desired output fiber extending from the second assembly.

In other embodiments, the first assembly has at least two sets of moveable mirrors and accepts optic fibers that have the capability of functioning as both inputs and outputs. In these embodiments, the optic fibers of the first assembly can act either as separate input and output fibers or as both input and output fibers, i.e., input and output fibers are indistinguishable. The second assembly is a reflective surface. Light exiting a fiber is reflected from the second assembly to one of the moveable mirrors of the first set, which reflects and directs the light back to the second assembly. Light is reflected off the second assembly to a moveable mirror of the second set, which is then reflected off the second assembly and to a desired fiber of the first assembly, where the light enters the fiber and routed to a desired destination.

Figure 1A:
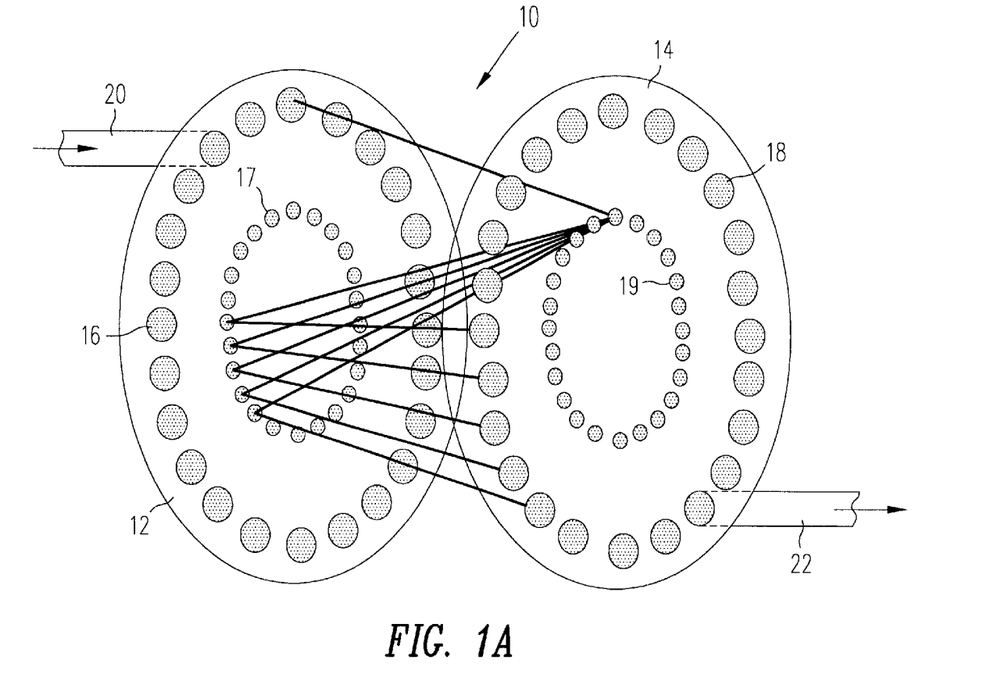
FIG. 1A shows an optical switch having moveable mirrors and lens sub-assemblies on two planes according to one embodiment of the present invention.

FIG. 1A shows a free-space optical switch 10 according to one embodiment of the present invention. Optical switch 10 includes two assemblies 12 and 14 facing each other and separated by a fixed distance. For this embodiment, assemblies 12 and 14, which can be formed of silicon, are also referred to as input and output assemblies, respectively. Input assembly 12 includes a plurality of N fiber and lens sub-assemblies 16 and M beam-steering elements, such as moveable mirrors 17, while output assembly 14 includes a plurality of M fiber and lens sub-assemblies 18 and N beam-steering elements, such as moveable mirrors 19. It should be noted that each moveable mirror is not limited to a single mirror, but can be more than one mirror, such as an array of mirrors. This forms an N×M optical switch, where N and M can be equal. In one embodiment, shown in FIG. 1A, sub-assemblies 16, 18 and mirrors 17, 19 are arranged in concentric circles, with mirrors 17, 19 forming the smaller of the two circles. In another embodiment, shown in FIG. 1B, the arrangement is concentric squares. Input optical fibers 20 direct light through corresponding N sub-assemblies 16, into the free-space region between input assembly 12 and output assembly 14, and toward N mirrors 19.

Mirrors 19 are positioned to reflect the incident light to a desired one of M mirrors 17, where each of one of M mirrors 17 is positioned to reflect light toward a corresponding one of M sub-assemblies 18. Suitable moveable mirrors are disclosed in commonly-owned U.S. patent application Ser. No. 09/870,967, entitled "Snap-Down Mirror for Optical Switch", and Ser. No. 09/948,176, entitled "Soft Snap-Down Mirror for Optical Switch", both of which are incorporated by reference in their entirety. In one embodiment, the circle of sub-assemblies 16 and 18 have diameters that are twice that of the circle of mirrors 17 and 19. Thus, by directing light to the appropriate mirror 17 of input assembly 12, light from an input optical fiber can be directed to any one of output optical fibers 22 emanating from output assembly 14. Further, this N×M switch only requires N+M mirrors.

Figure 2:
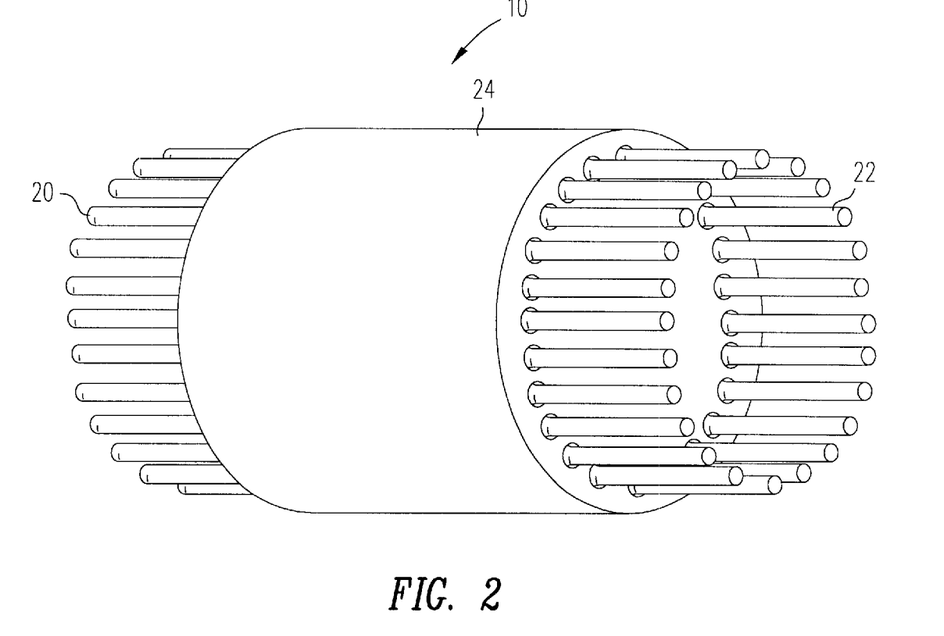
FIG. 2 shows the optical switch of FIG. 1 enclosed.

FIG. 2 shows switch 10 of FIG. 1A with the free-space region enclosed, such as by an enclosure 24, which can be made of steel or other suitable material. Packaging of the switch requires hermetic sealing and a dry environment for operation at low temperatures.

The N×M switch has N input fibers 20 and M output fibers 22. It is assumed that the fibers are properly terminated so as to minimize back reflection losses. The angular deviations required from the beam steering elements (e.g., moveable mirrors) can then be made to be approximately constant in elevation angle with a varying azimuthal angle through an appropriate choice of each diameter. The steering elements need a slight variation in elevation or tilt angle to correct for the elliptical distortion that results from cutting the cone of light at an angle. Without any variation in elevation angle, each of the mirrors would trace out an ellipse on the opposing plane, instead of a circle as formed by the fiber and lens sub-assemblies. The elliptical distortion can be modified by changing the relative diameters of the collimator and mirror circles.

Figure 3:
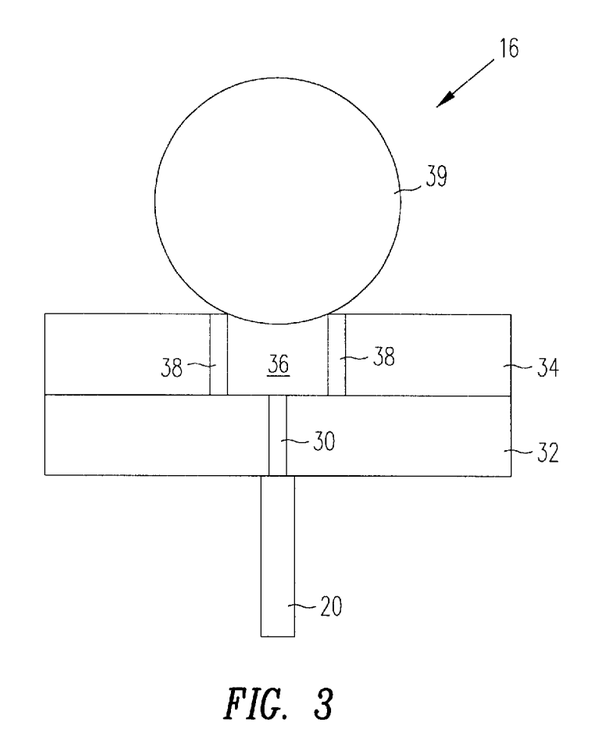
FIG. 3 shows one embodiment of an assembled fiber and lens sub-assembly.

FIG. 3 shows one embodiment of sub-assembly 16 (or 18) of FIG. 1A. An unbuffered portion 30 of optic fiber 20 (or 22) is inserted into a hole in a silicon baseplate 32. The size and relative positions of the holes can be defined precisely using lithography, and the holes can be etched, e.g., using a reactive ion etcher. After the ends of unbuffered portions 30 are cleaved, baseplate 32 is polished, and an anti-reflection coating is added. A second silicon baseplate 34 is produced with through holes 36 and kinematic points 38 for mounting lenses 39. Second baseplate 34 may also be comprised of another material, such as titanium or glass if the fiber to lens alignment is done separately. First and second baseplates 32 and 34 are aligned and bonded, thus producing an assembly which combines the terminated fibers with the lenses. This assembly provides for the precise lateral location of all fibers and lenses relative to each other through lithography. It also provides for the precise vertical location of the lens (and its focal point) relative to the fiber termination through the control of the thickness of second baseplate 34. Further, precise lateral and angular alignment between the lenses and the moveable mirrors is possible because the moveable mirrors are also fabricated baseplate 34.

There are many other ways to mount lenses 39, one of which is disclosed in commonly-owned U.S. application Ser. No. 09/845,894, entitled "Lens Arrays and Methods of Making the Lens Arrays", incorporated by reference in its entirety. Other suitable methods to mount lenses 39 include using a pigtailed lens assembly with active alignment, inserting the fibers and cleaving them at an angle, or using a molded glass array. In a pigtailed lens assembly, the fiber is already fused to, i.e., pre-aligned with, the lens. This assembly is then actively aligned with a corresponding mirror by precisely positioning the assembly while monitoring its output until the desired position is obtained. Another way is to insert the fiber through a hole large enough in the first baseplate so that the fiber can be positioned at various angles. The fiber is then inserted into a form-fitting hole in the second baseplate and cleaved at an angle and polished. As a result, the light exits the fiber at the desired angle to the corresponding mirror and back reflection is minimized.

As seen from FIG. 1A, input light exits the lens at an angle with respect to the plane of input assembly 12 so as to be directed to an appropriate steering or moveable mirror 19. This can be done, in one embodiment, by inserting input fibers 20 at an angle and collimating the beams with spherical or ball lenses offset with respect to the fiber axis. If another type of lens is used, the tilt angle of the lens is adjusted to be at the same angle as the fiber. In other embodiments, the fiber may be offset with respect to the optical axis of the lens, so that the light exits the lens at the proper angle. In this case, most lenses will produce aberrations. Depending on the details of the aberrations, it may be necessary to design a special lens that is compensated to reduce the aberrations. In another embodiment, a lens and prism combination is used, where the lens collimates the light on-axis, and the prism re-directs the collimated beam in the appropriate direction. As discussed above, a pigtailed lens assembly or molded glass array can also be used.

Thus, light exits each input fiber, diverges upon entering hole 36 (FIG. 3), and is collimated and directed by lens 39 towards a moveable mirror 19 that is associated with the particular input fiber. The light is reflected off moveable mirror 19, which must be aimed precisely, and directed towards a desired second moveable mirror 17. The second moveable mirror 17, which must also be aimed precisely, directs the light to the lens sub-assembly 18 associated with the desired output fiber 22 and thus into the fiber itself.

In one embodiment, input fibers 20, lens sub-assemblies 16, and moveable mirrors 19 and the spacing between the elements are such that if moveable mirrors 19 were flat, all optical inputs would be directed towards a convergent point on the axis of rotational symmetry of the switch. Because of the symmetry of the design, if light were sent in through any one of output fibers 22, and if moveable mirrors 17 associated with those fibers were flat, the light would also be directed toward a convergent point on the axis of symmetry.

In one embodiment, shown in FIG. 1A, moveable mirrors 17 and 19 are arranged in circles that are concentric with and smaller than the circles formed by lens sub-assemblies 16 and 18, respectively, e.g., half the diameter. This arrangement allows mirrors 17 and 19 to be at a substantially constant elevation angle with an azimuthal angle that varies in predetermined increments, based on the number of lens sub-assemblies 16 and 18. As shown in FIG. 1A, the light from one of the N moveable mirrors 19 sweeps out a conic section (as the azimuth is changed) that re-directs the input light to any of the M moveable mirrors 17. Due to the symmetry of the design, mirrors 19 are able to redirect the light towards any of the M lens sub-assemblies 18 and output fiber 22 to route light from any input fiber to any output fiber.

Figure 4:
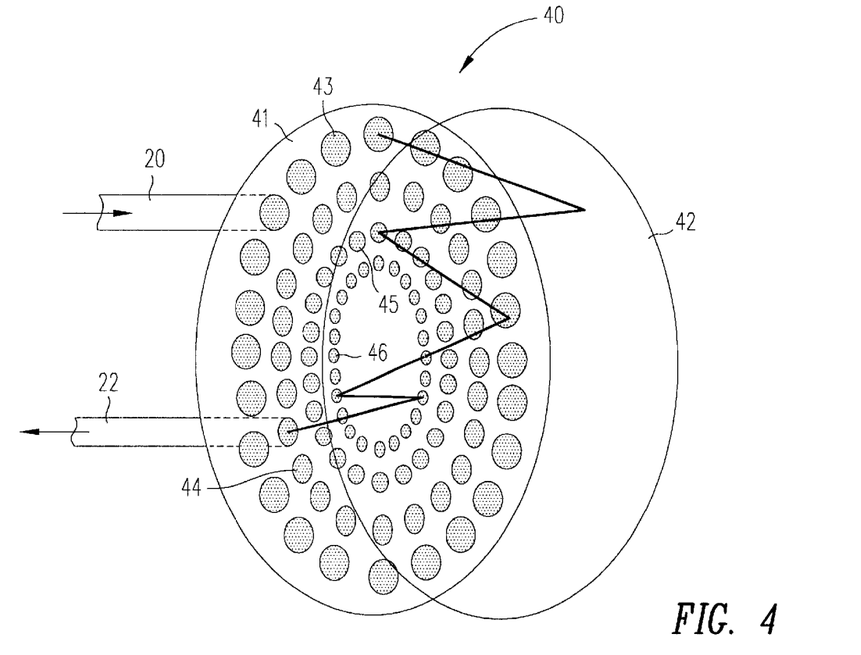
FIG. 4 shows an optical switch having moveable mirrors and lens sub-assemblies on one plane according to another embodiment of the present invention.

FIG. 4 shows another embodiment of the present invention, in which the lens sub-assemblies and moveable mirrors are located on a single assembly. This allows the switch to be re-configurable by allowing fibers to be used as both inputs and outputs. In FIG. 4, an N×M optical switch 40 includes a first assembly 41 and a second assembly, such as a stationary mirror 42. Mirror 42, also known as a folding mirror, can be a flat, concave, or any other suitable type of mirror. The folding mirror may be made out of glass or silicon coated with gold or a high reflectivity dielectric coating. First assembly 41, in this embodiment, has an outer circle of N input lens sub-assemblies 43 coupled to input optical fibers 20, a smaller concentric circle of M output lens sub-assemblies 44 coupled to output optical fibers 22, a concentric circle of N beam steering elements, such as moveable mirrors 45 within the circle of output sub-assemblies 44, and an inner concentric circle of M beam steering elements, such as moveable mirrors 46 within the circle of mirrors 44. In one embodiment, the circle of sub-assemblies 43 is twice the diameter of the circle of mirrors 45, and the circle of sub-assemblies 44 is twice the diameter of the circle of mirrors 46. Note that in this design, mirrors 46 in the innermost circle have a larger tilt angle than mirrors 45 in the next outer circle.

Each of the N sub-assemblies 43 directs light from an input fiber 20 to stationary mirror 42, which reflects the light to a corresponding one of N moveable mirrors 45. Each moveable mirror 45 can be positioned (or tiled) to re-direct the light, after reflection from stationary mirror 42, to any one of the M moveable mirrors 46. The selected one of moveable mirrors 46 re-directs the light off stationary mirror 42 to a corresponding one of the M output sub-assemblies 44 and onto output fiber 22. Similar to the above embodiment, this embodiment also only requires N+M moveable mirrors.

Figure 5:
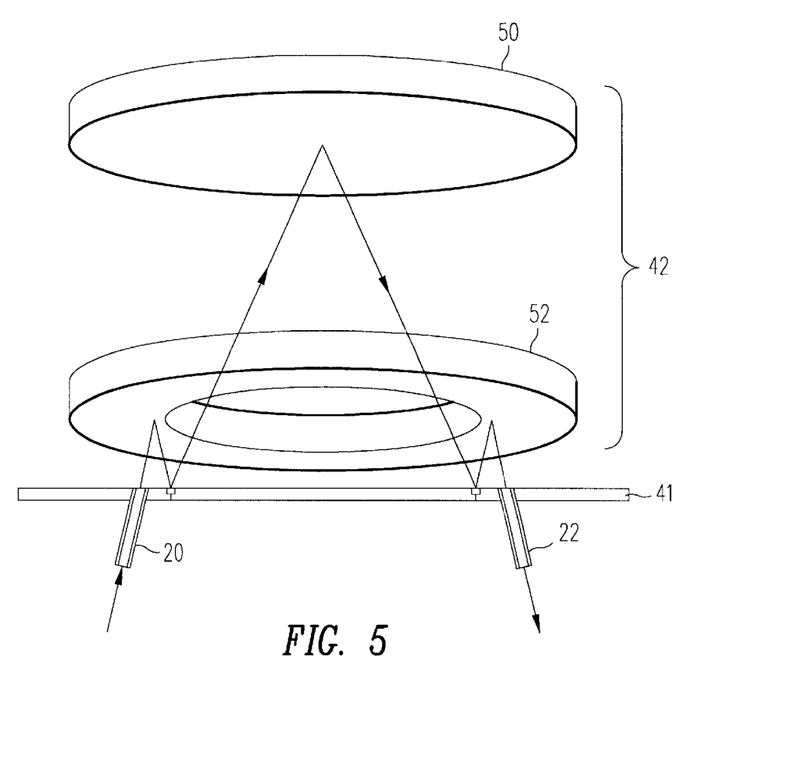
FIG. 5 shows an optical switch having an annular and a circular folding mirror according to one embodiment.

In another embodiment, shown in FIG. 5, stationary mirror 42 is comprised of two mirrors, a first mirror 50 and an annular second mirror 52 located between first mirror 50 and first assembly 41. Annular second mirror 52 has a center opening to allow light to travel from first assembly 41 to first mirror 50 through second mirror 52 and be reflected back from first mirror 50 to first assembly 41. A typical path is shown in FIG. 5. This embodiment allows the total path length to be reduced by decreasing the distance between annular second mirror 52 and first assembly 41.

In these types of embodiments when the moveable mirrors and lens sub-assemblies are only located on first assembly 41, fibers can be used as both inputs and outputs. It will be appreciated by those skilled in the art that the moveable mirrors and lens sub-assemblies do not have to be located on the same plane or assembly to achieve the advantages of the invention. This "flex" design allows the switch to be re-configurable. Each fiber coupled to a sub-assembly 43 or 44 can be used as either an input to or output from the switch. Consequently, with N+M moveable mirrors and N+M sub-assemblies, any one input can be redirected to one of (N+M−1) outputs, or even back to itself. Thus, a switch with N+M fibers and N+M moveable mirrors can be re-configured to any size switch ranging from 1 by (N+M−1) to N by M to (N+M−1) by 1. Re-configuration can be done simply through software or hardware (e.g., physically changing the allowable positions of the moveable mirrors).

Figure 1B:
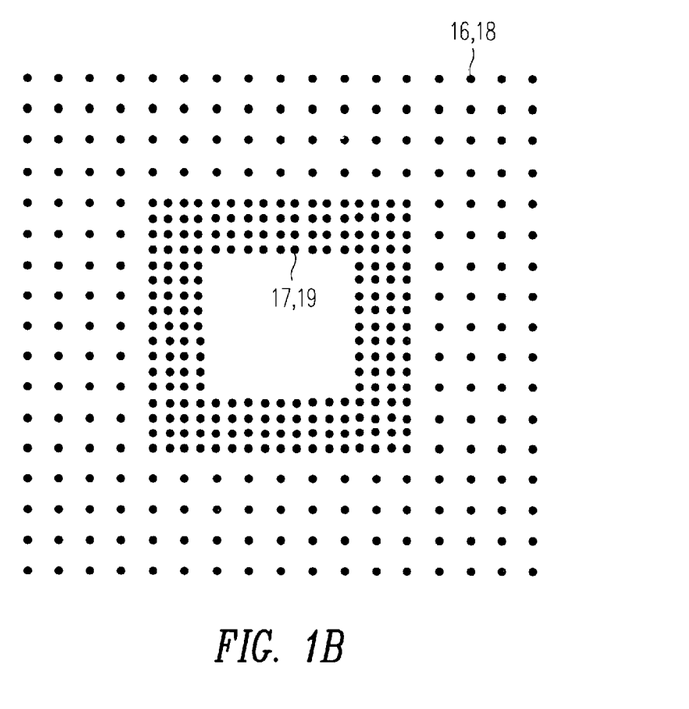
FIG. 1B shows a top view of an arrangement of moveable mirrors and lens sub-assemblies according to another embodiment.

In other embodiments of the flex design, lens sub-assemblies 43 and 44 are merged into a single circle, and moveable mirrors 45 and 46 are merged into a single circle. However, because the N+M sub-assemblies and moveable mirrors each only form one circle, instead of two, there are necessarily a lower number of elements than can be formed on the switch. Other embodiments include using a concave mirror instead of a flat mirror for the beam steering elements and arranging the lens sub-assemblies and moveable mirrors each in more than two concentric circles. An example of one embodiment, in which the lens sub-assemblies and moveable mirrors are arranged in patterns that are not simple circles, is shown in FIGS. 1B and 6.

Figure 6:
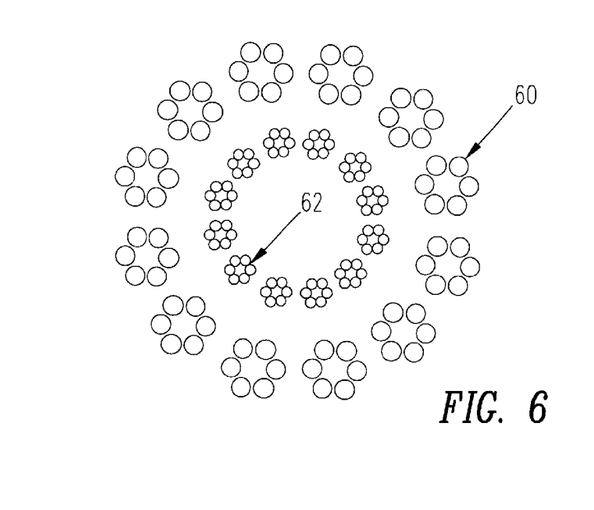
FIG. 6 shows an example of one configuration layout of moveable mirrors and sub-assemblies according to the present invention.

In FIG. 6, fiber and lens sub-assemblies 60 are arranged in a first circular pattern composed of smaller circular patterns. Within this first circular pattern is a second circular pattern of moveable mirrors 62 arranged in smaller circular patterns. Such an arrangement allows any one of mirrors 62 to direct light to any of the other mirrors 62. In the example shown in FIG. 6, there are 6 mirrors per small circle and 12 of these small circles for a total of 72 moveable mirrors 62. In order for a moveable mirror to be able to direct light to each of the other 71 mirrors and back onto itself, each mirror would need to controllable in 72 different positions. However, this same size switch can be formed using multi-stage mirrors requiring a much lower number of controllable positions.

Figure 7A:
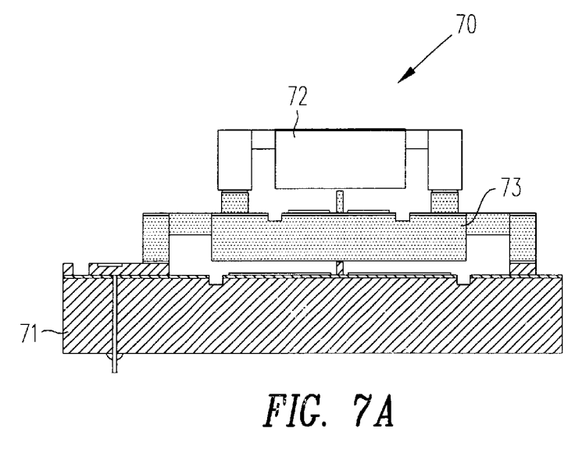
FIGS. 7A, 7B, and 7C show one embodiment of a moveable mirror according to the present invention.
Figure 7B:
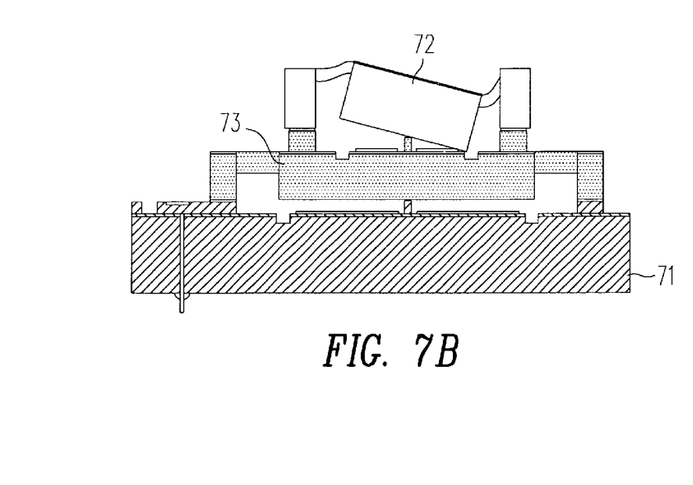

FIG. 7A shows a multi-stage mirror 70 having two stages. Multi-stage mirror 70 can be used as moveable mirror 62. Mirror 70 includes a base 71, a first moveable stage 72, and a second moveable stage 73. FIG. 7B shows first moveable stage 72 moved to a desired position. While maintaining that position, second moveable stage 73 is moved to a desired position. The combination of the two positions (a convolution) results in mirror 70 directing light to a desired location. Continuing with the above example, first moveable stage 72 is moved to one of twelve controllable positions, corresponding to one of the twelve smaller circular patterns of six mirrors 62. Second moveable stage 73 is then moved to one of six controllable positions, corresponding to one of the six positions within the smaller circular patterns.

Figure 7C:
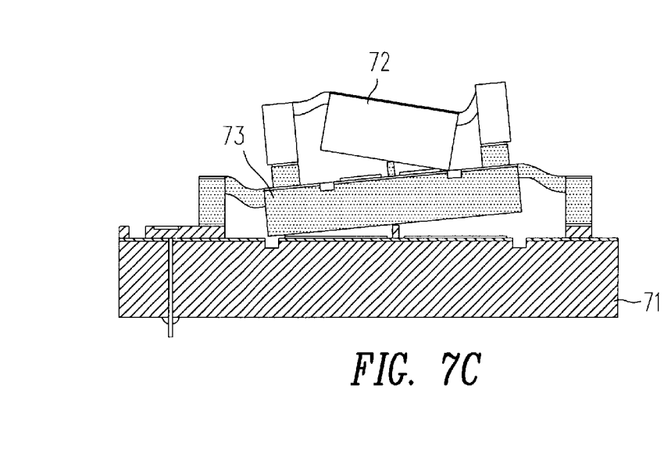

Accordingly, light can be directed to any one of the 72 positions, using a mirror that has only 18 (12+6) controllable positions, instead of 72 positions for a single stage mirror. It should be noted that multi-stage mirrors with more than two stages can also be used, e.g., a three-stage mirror, in which each stage has 8 controllable positions allows a 512-port (8*8*8) switch to be formed with mirrors having only 24 (8+8+8) controllable positions. Thus, using multi-stage mirrors, large scale switches can be formed with a lower number of controllable positions, which results in simpler control of the mirrors.

It should be realized that the advantages of the invention are retained so long as the fibers and mirrors are positioned such that substantially equal elevation angles are required for all desired connection paths. Furthermore, the fiber positions cannot coincide with the mirror positions. Thus, in order to have the largest switch array in the smallest volume, the design of the switch should maximize the number of moveable mirror positions that do not overlap with the fibers. The fibers are usually located nearly at twice the radial distance from the center of the array so that the light from the fiber hits the corresponding mirror.

An advantage of these embodiments is that the alignment of all of the fiber terminations, lenses, and beam steering elements is set by the relative alignment of each element on a single surface. This relative alignment may be set using photolithographic techniques that are well known within the semiconductor industry. This also allows kinematic alignment of the separate components as they are assembled together with very high tolerances. In addition, all of the control electronics can be located in the plane of the beam steering elements, thus making interconnection simpler.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. An optical switch, comprising:
   a first assembly having a first planar surface, the first assembly comprising:
   a first arrangement of M first moveable mirrors; and
   a second arrangement of N first fiber and lens sub-assemblies outside of the first moveable mirrors; and
   a second assembly having a second planar surface facing the first planar surface, the second assembly comprising:
   a third arrangement of N second moveable mirrors; and
   a fourth arrangement of M second fiber and lens sub-assemblies outside the second moveable mirrors.

2. The optical switch of claim 1, wherein the first, second, third, and fourth arrangements are approximately circular.

3. The optical switch of claim 2, wherein each of the approximately circular arrangements is a simple circle.

4. The optical switch of claim 3, wherein the diameter of the circle of N first fiber and lens sub-assemblies is approximately twice the diameter of the circle of M first moveable mirrors, and wherein the diameter of the circle of M second fiber and lens sub-assemblies is approximately twice the diameter of the circle of N second moveable mirrors.

5. The optical switch of claim 1, wherein each of the N first fiber and lens sub-assemblies corresponds to one of the N second moveable mirrors.

6. The optical switch of claim 5, wherein each of the N second moveable mirrors is moveable to re-direct light from the corresponding one of the first fiber and lens sub-assemblies to each of the M first moveable mirrors.

7. The optical switch of claim 6, wherein each of the M first moveable mirrors corresponds to one of the M second fiber and lens sub-assemblies.

8. The optical switch of claim 1, wherein N is equal to M.

9. The optical switch of claim 1, further comprising N input fibers coupled to the N first fiber and lens sub-assemblies and M output fibers coupled to the M second fiber and lens sub-assemblies.

10. The optical switch of claim 1, wherein the first, second, third, and fourth arrangements are approximately square-shaped.

11. The optical switch of claim 1, wherein N and M are both greater than 16.

12. The optical switch of claim 1, wherein each of the N first fiber and lens sub-assemblies comprise a pigtailed lens assembly.

13. The optical switch of claim 1, wherein the N second moveable mirrors change azimuthal angular positions at fixed intervals.

14. A method of making an optical switch, comprising:
   providing first and second planar substrates;
   forming N and M through holes in a first pattern in the first and second substrates, respectively;
   forming M and N apertures in a second pattern interior to the through holes in the first and second substrates, respectively;
   inserting an input optic fiber and a collimating element into each of the N through holes;
   inserting a moveable mirror into each of the M and N apertures; and
   inserting an output optic fiber and a collimating element into each of the M through holes.

15. The method of claim 14, wherein the first and second patterns are approximately circular.

16. The method of claim 15, wherein the approximately circular pattern is a simple circle.

17. The method of claim 16, wherein the diameter of the circle of through holes is approximately twice the diameter of the circle of apertures.

18. The method of claim 14, wherein the forming is by a photolithographic process.

19. The method of claim 14, wherein the collimating element comprises a lens.

20. The method of claim 14, wherein the collimating element comprises a diffraction grating.

21. The method of claim 14, wherein the first and second patterns are approximately square-shaped.

22. An optical switch, comprising:
   a first assembly having a first planar surface, the first assembly comprising:
   a first arrangement of moveable mirrors; and
   a second arrangement of fiber and lens sub-assemblies outside of the moveable mirrors; and
   a second assembly having a second planar surface facing the first planar surface, the second assembly comprising a stationary mirror.

23. The optical switch of claim 22, wherein the first and second arrangements are approximately circular.

24. The optical switch of claim 23, wherein the approximately circular arrangement of moveable mirrors comprises two concentric simple circles of moveable mirrors, and wherein the approximately circular arrangement of fiber and lens sub-assemblies comprises two concentric simple circles of fiber and lens sub-assemblies.

25. The optical switch of claim 24, further comprising input optical fibers coupled to the outer circle of fiber and lens sub-assemblies and output optical fibers coupled to the inner circle of fiber and lens sub-assemblies.

26. The optical switch of claim 25, wherein each of the outer circle of fiber and lens sub-assemblies corresponds to one of the outer circle of moveable mirrors.

27. The optical switch of claim 26, wherein each of the outer circle of moveable mirrors is moveable to re-direct light from the corresponding one of the outer circle of fiber and lens sub-assemblies to each of the inner circle of moveable mirrors.

28. The optical switch of claim 27, wherein each of the inner circle of moveable mirrors corresponds to one of the inner circle of fiber and lens sub-assemblies.

29. The optical switch of claim 24, wherein the outer circle of moveable mirrors change angular positions at fixed intervals.

30. The optical switch of claim 22, wherein the first and second arrangements are approximately square-shaped.

31. The optical switch of claim 22, wherein the fiber and lens sub-assemblies can be used as both light inputs and outputs.

32. The optical switch of claim 22, further comprising:
a third assembly located between the first and second assemblies, the third assembly comprising an annular mirror.

33. The optical switch of claim 22, wherein the moveable mirrors are multi-stage moveable mirrors.

34. A method of forming an optical switch, comprising:
providing first and second planar substrates, wherein the second substrate has a stationary mirror facing the first substrate;
forming through holes in a first pattern in the first substrate;
forming apertures in a second pattern interior to the through holes in the first substrate;
inserting an optic fiber and a collimating element into each of the through holes; and
inserting a moveable mirror into each of the apertures.

35. The method of claim 34, further comprising moving a first moveable mirror to direct light entering the switch from a first optic fiber to a second moveable mirror.

36. The method of claim 35, further comprising moving the second moveable mirror to direct the light to a second optic fiber exiting the switch.

37. The method of claim 36, further comprising moving the first moveable mirror to direct light entering the switch from the second optic fiber and moving the second moveable mirror to direct the light to the first optic fiber exiting the switch.

38. The method of claim 34, wherein the first and second patterns are approximately circular.

39. The method of claim 38, wherein the approximately circular patterns comprise simple circles.

40. The method of claim 34, wherein the first and second patterns are approximately square-shaped.

41. The method of claim 34, wherein the optic fiber can be an input or an output fiber.

42. The method of claim 34, further comprising:
providing a third planar substrate between the first and second planar substrates, wherein the third substrate comprises an annular mirror.

43. The method of claim 34, wherein the collimating element comprises a lens.

44. The method of claim 34, wherein the collimating element comprises a diffraction grating.

45. The method of claim 34, wherein the forming is by a photolithographic process.

46. The method of claim 34, wherein the moveable mirror is a multi-stage moveable mirror.

47. A reconfigurable optical switch, comprising:
a first assembly comprising:
a first arrangement of moveable mirrors; and
a second arrangement of fiber and lens sub-assemblies and
a second assembly comprising a stationary mirror facing said moveable mirrors;
wherein said moveable mirrors are moveable to direct light to at least a plurality of said fiber and lens sub-assemblies, and wherein each of said plurality of fiber and lens sub-assemblies can be used as either an input or output of said light.

48. The switch of claim 47, wherein said plurality is all of said fiber and lens sub-assemblies.

49. The switch of claim 47, wherein the moveable mirrors are multi-stage moveable mirrors.

50. A method of reconfiguring an optical switch, said optical switch having a plurality of fibers coupled to a substrate, the method comprising:
directing light from a first one of said plurality of fibers to a first moveable mirror;
re-directing said light to a second moveable mirror; and
re-directing said light to a group of said plurality of fibers, wherein said group of fibers can be used to either input or output said light.

51. A reconfigurable optical switch, comprising:
a first assembly comprising:
a first arrangement of moveable mirrors; and
a second arrangement of fiber and lens sub-assemblies; and
a second assembly comprising a stationary mirror facing said moveable mirrors;
wherein said first arrangement comprises:
at least two of said moveable mirrors moveable to direct light from a first fiber and lens sub-assembly to a second fiber and lens sub-assembly, and
at least two of said moveable mirrors moveable to direct light from said second fiber and lens sub-assembly to said first fiber and lens sub-assembly.

* * * * *